June 2, 1931.  A. C. FOX  1,807,691
LUBRICATOR
Filed Dec. 22, 1928   2 Sheets-Sheet 1
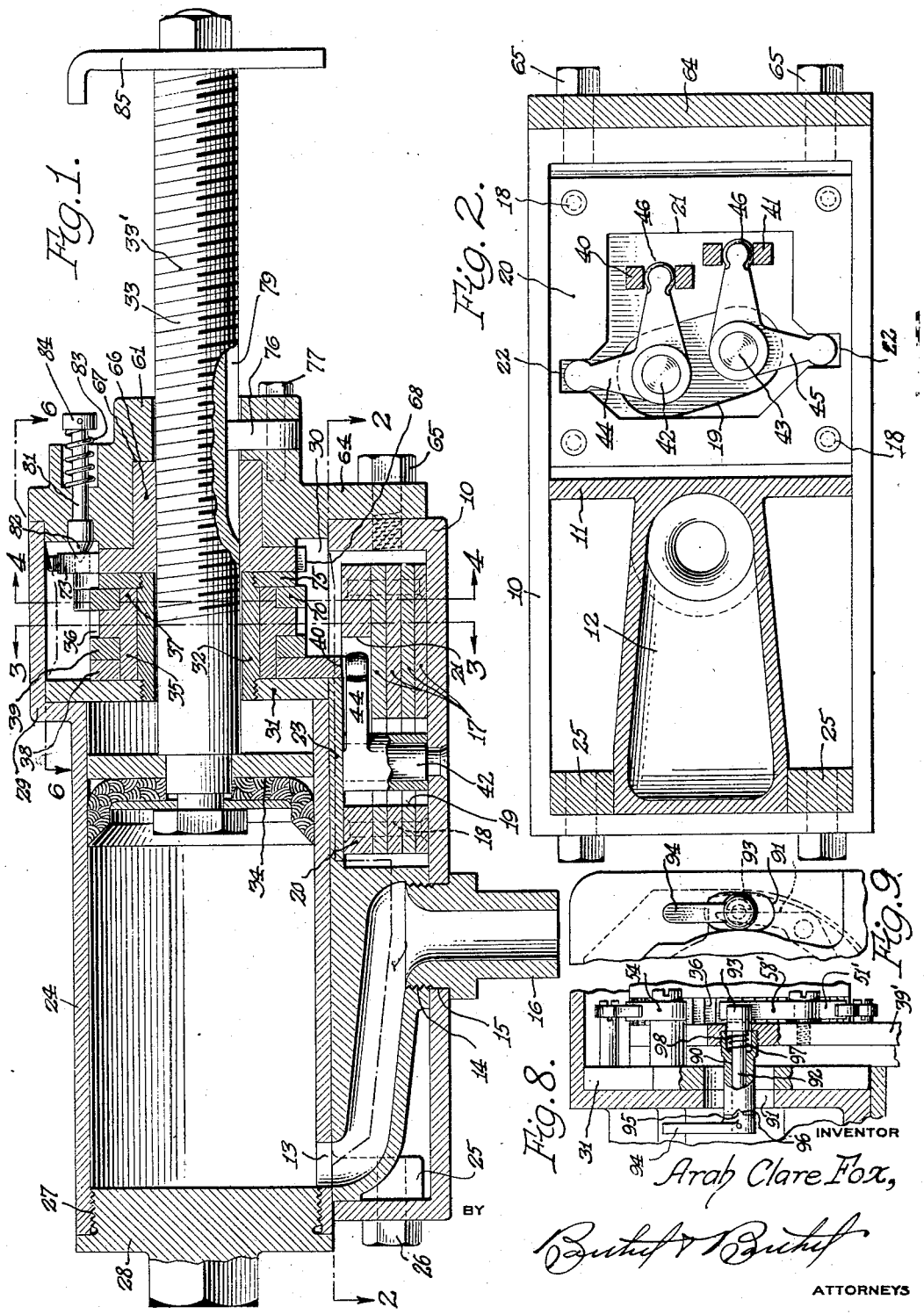
INVENTOR
Arah Clare Fox,
BY
ATTORNEYS

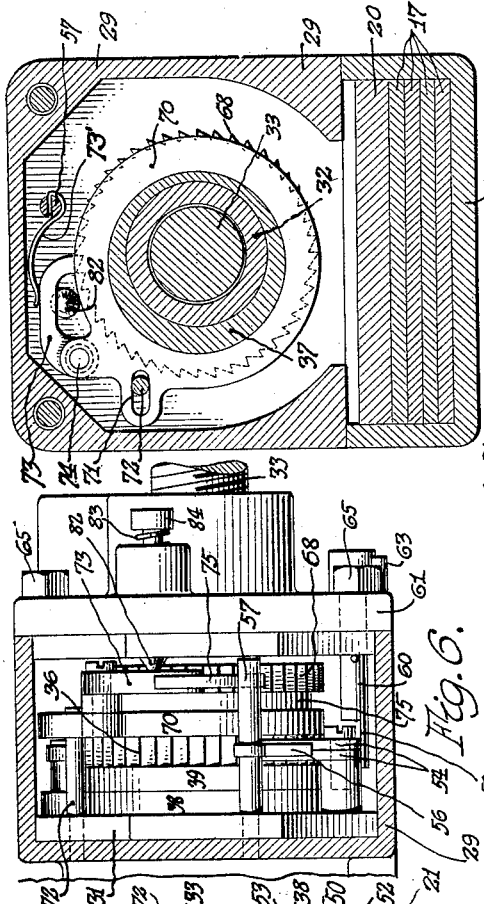

Patented June 2, 1931

1,807,691

UNITED STATES PATENT OFFICE

ARAH CLARE FOX, OF GRAND RAPIDS, MICHIGAN

LUBRICATOR

Application filed December 22, 1928. Serial No. 327,942.

The present invention pertains to a novel lubricator designed to supply lubricant automatically to a bearing, particularly a bearing on an oscillating member. The principle of the invention involves the utilization of a weight which is reciprocated by the oscillatory movement, whereby the weight is connected or geared to a feed device which injects lubricant into the bearing. This connecting gear or mechanism is preferably of a double acting character, being arranged to operate the feed device on the movement of the weight in either direction. The feed mechanism includes a ratchet actuated by two pawls which in turn are connected respectively to the devices which respond to the movement of the weight in both directions. Means is also provided for permanently disconnecting one of the pawls from the ratchet, whereby the rate of feed may be reduced by half.

This ratchet however operates an eccentric lying adjacent another ratchet and connected thereto by a pawl. By this means, there is a considerable reduction in speed between the first ratchet and the second. The second ratchet is formed with or attached to a nut surrounding a screw carrying a piston operating in the cylinder which constitutes the receptacle for the lubricant. This screw is automatically held against rotation, so that the movement of the second ratchet and the nut associated therewith slides the screw into the cylinder and causes delivery of lubricant from the latter to the bearing.

The invention is fully disclosed by way of example in the following description and in the accompanying drawings in which—

Figure 1 is a longitudinal section of the device;

Fig. 2 is a plan section of the base, taken on the line 2—2 of Fig. 1;

Fig. 3 is a cross section of the device on the line 3—3 of Fig. 1;

Fig. 4 is a similar section on the line 4—4 of Fig. 1;

Fig. 5 is an end view of the device, partly in section;

Fig. 6 is a plan section on the line 6—6 of Fig. 1;

Fig. 7 is a fragmentary elevation of a machine to which the device is applied;

Fig. 8 is a detail longitudinal section of a modified construction; and

Fig. 9 is a fragmentary elevation corresponding thereto.

Reference to these views will now be had by use of like characters which are employed to designate corresponding parts throughout.

In Figure 7 there is illustrated a mechanism to be lubricated and consisting, for example, of a disk or wheel 1 which is to be rotated by a reciprocating cross head 2 moving in guides 3. Motion is transmitted by a connecting rod or pitman 4 having its ends journaled respectively to the cross head 2 and to a stud 5 on the disk 1 at some distance from the center thereof. The lubricating device, which will now be described, is applied to the bearing at the member 5.

This device includes a base member 10 in the nature of a rectangular box or trough and having a substantially central transverse partition 11. At one side of the partition is formed a channel member or conduit 12 having its upper end 13 disposed in the top plane of the base as shown in Fig. 1, and its lower end in the nature of an internally threaded opening 14 communicating with a port 15 in the bottom of the base member. A nipple 16 lying normally below the base member has its upper end threaded into the end 14 of the channel and its lower end fitted into the connecting rod 4 in such a manner as to permit a flow of fluid to the bearing surfaces at the stud 5. At the other side of the partition 11 the base member contains a weight consisting of a number of superposed members or laminations 17 held together at the corners by rivets 18 but permitted to slide on the bottom of the base. The weight thus formed has a somewhat oval recess 19 while the upper lamination 20 has a considerably larger opening of a somewhat irregular shape but including generally a nearly square portion 21 with lateral branches 22 and having its edges confining those of the opening 19 as shown in Figure 2.

The channel member 12 is formed with a plate 23 extending about half way over the composite weight 17—20 as shown in Fig. 1. Upon the channel member and extension thereof is mounted a cylinder 24 held by lugs 25 extending therefrom into the base 10 and secured against the rear wall of the latter by bolts 26. The cylinder is formed with an internally threaded open rear end 27 closed by a plug 28. The other end of the cylinder is enlarged and forms substantially square as indicated by the numeral 29 in Figs. 1, 3 and 4, and has a recess 30 communicating with the base for a purpose which will presently appear. A partitioning disk 31 is mounted in the cylinder between the body portion and the enlarged portion 29 thereof. Into this disk is threaded one end of a bushing 32 through which is passed a rod 33 equipped with a piston 34 slidable in the body of the cylinder.

On the bushing in turn is mounted a rotatable collar 35 formed with a ratchet 36 and having at one side of the ratchet a portion 37 which is eccentric with respect to the bushing. On the other side of the ratchet, the collar is surrounded by a pair of carriers 38 and 39 of like construction and formed with forks 40 and 41 projecting through the recess 30 into the base member 10 as shown in Fig. 3. In the base are mounted posts 42 and 43 accommodated in the recess of the weight, and on these posts are journaled bell crank levers 44 and 45 disposed in the larger opening 21 of the upper weight section 20. The branches 22 of the opening 21 accommodate and retain one arm of each of the bell cranks, while the remaining arms are received in the forks 40 and 41 respectively.

On the sliding of the weight due to the oscillation of the member 4, the bell cranks will be swung simultaneously in opposite directions due to the fact that the arms thereof received in the branches 22 extend in opposite directions, and the carriers 38 and 39 will likewise be swung in opposite directions about the collar 35. The bell crank lever ends received in the forks 40 and 41 have a spherical formation 46 to present constant bearing surfaces in view of the swinging of the bell crank levers in a given plane and the arcuate movement of the forks in a plane perpendicular thereto.

With reference now to Fig. 3, it will be seen that the carriers 38 and 39 support pawls 50 and 51 respectively on studs 52. The pawls are positioned to drive the ratchet 36 when moved in one direction and to slide idly over the ratchet in the other direction. The pawls are held in engagement with the ratchet by means of springs 53 anchored on the carriers. Thus, since the carriers are swung simultaneously in opposite directions by the weight, the ratchet will be driven on each sliding movement of the weight, by one or the other of the pawls in alternating manner.

A detent 54 pivoted on a stud 55 held by the cylinder body engages the ratchet to prevent reverse movement thereof. This detent is held in engagement with the ratchet by means of a spring 56 anchored to a stud 57 on the cylinder body as shown in Fig. 3. The pawl 51 has an extension 58 engageable by the semi-cylindrical end 59 of a rod or pin 60 (Fig. 5) extending through and journaled in a head 61 which closes the cylinder at the enlargement 29 thereof. The exterior end of the member 60 carries an operating finger 62 limited in its movement between a pair of studs 63 on the head 61. The end 59 acts as a cam against the extension 58, when adjusted by means of the finger 62, to throw the pawl 51 out of engagement with the ratchet so that the latter is operated only by the pawl 50 and thereby has its average speed reduced.

The above mentioned head 61 has a downwardly extending tongue 64 secured to the front wall of the base member 10 by means of bolts 65 whereby it is held in position. This member receives a nut 66 threaded on the threaded portion 33' of the rod 33 and held between the free ends of the bushing 32 and a shoulder 67 in the head 61. The nut is formed with a ratchet 68 which, when driven by the means presently to be described, constitutes the final member in the driving gear between the weight and the nut which causes the threaded rod 33 to slide.

The eccentric 37 of the collar 35 is surrounded by a carrier 70 having a slotted portion 71 receiving a pin 72 mounted in the cylinder body, whereby to prevent rotation of this member. A pawl 73 is pivotally mounted on a stud 74 carried by the member 70 and co-operates with the ratchet 68 as clearly shown in Fig. 4. A spacer 75 is threaded on the remaining end of the bushing 32, between the eccentric 37 and ratchet 68, to hold the various parts against sliding lengthwise of the bushing.

It will be apparent now that each complete revolution of the ratchet 36 and eccentric 37 carried thereby results in but one movement of the pawl 73 or an advance of one step or tooth by the ratchet 68 which is the direct actuating member for the nut 66. Thus, the average speed of the ratchet 36 is considerably reduced when transmitted to the nut and screw, namely, in the ratio of $x:1$ where $x$ is the number of teeth on the ratchet 36. The pawl 73, it will be seen, is held in engagement with the ratchet 68 by a spring 73' anchored to the cylinder.

In order that the rod 33 may be driven axially by rotation of the non-sliding nut thereon, it is necessary to hold the rod against rotation. This is accomplished by means of a key 76 pivotally supported on the head 61 by a stud 77 and having a pointed end 78 received in a slot 79 in the rod. The nature of the slot however is to permit turning of the rod by hand in the reverse or non-feeding direction. The key is normally held with its end in the slot by means of a spring 80 bearing on the free end thereof.

In order to break the driving connection to the nut 66 when the piston 34 reaches the end of its inward stroke, there is provided a pin 81 slidably mounted in the head 61 and equipped with a pointed head 82 adapted to enter between the carrier 70 and the pawl 73 to raise the latter against the action of the spring 73'. The pin 81 is however surrounded by a spring 83 engaging head 84 on the outer end thereof to retract the device from the pawl 73 under normal conditions. The free or outer end of the rod 33 carries an operating member 85 adapted to engage the head 84 and move the pin 81 inwardly to release the ratchet 82 when the piston and rod have reached the end of their inward stroke.

It will be obvious that, during the inward motion of the rod by the means described, the piston 34 will force lubricant from the chamber of the cylinder body 24 through the channel 12 and nipple 16 into the bearing of the stud 5. When the piston has reached the end of its inward movement, the rod may be withdrawn by being screwed manually in the direction which propels it outwardly, as permitted by the nature of the point 78 of the locking key in the manner already described. The body portion 24 of the cylinder may be refilled when the plug 28 is removed.

In Figures 8 and 9 is illustrated a modified construction wherein one of the pawls may be rendered inoperative, as in Figure 3, without producing friction between the idle pawl and its holding cam by the movement of the carrier which supports the idle pawl. With this object in view, the carrier 39', corresponding to the carrier 39 of Figure 3, is extended upwardly somewhat and provided with a sleeve 90 threaded therein. This sleeve passes through registering slots 91 formed in the member 31 and the shoulder of the enlargement 29. In the sleeve is journaled a shaft 92 having at one end a semi-cylindrical head 93 which is adapted to act as a cam against the free arm 58' of the pawl 51'.

The outer end of the shaft 92 has secured thereto an operating finger 94 provided with a tooth 95 adapted for reception selectively in notches 96 formed in the outer end of the sleeve 90. The positioning of the tooth in these notches determines the adjustment of the split head 93 relative to the active and idle positions of the pawl 51'. Thus, when the cam head 93 engages the arm 58', both these parts move with the idle carrier 39' since both are carried thereby, with the result that there is no relative movement or friction between the members 58' and 93.

The adjustment of the tooth 95 in either of the notches 96 is secured by means of a spring 97 surrounding the shaft 92 in a cavity 98 formed in the inner end of the sleeve 90 in such a manner that the ends of the spring bear against the head 93 and the base of the cavity.

Although a specific embodiment of the invention has been illustrated and described, it will be understood that various alterations in the details of construction may be made without departing from the spirit of the invention as indicated by the appended claims.

What I claim is:—

1. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, and means operable by said weight for turning said nut.

2. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a ratchet carried by said nut, a pawl adapted to drive said ratchet, and an operative connection between said pawl and weight.

3. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a ratchet connected to said nut, a bell crank lever mounted in said base and having one end connected to said weight, a carrier connected to the other end of said lever, and a driving connection between said carrier and ratchet.

4. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a bushing surrounding said rod and fixed in said cylinder, a ratchet on said bushing, a pawl carrier adjacent said ratchet, a pawl on said carrier and engaging said ratchet, a connection between said weight and carrier for operating said pawl, a collar mounted eccentrically on said bushing, a pawl carrier surrounding said collar and held against rotation, a pawl on said carrier, and a ratchet carried by said nut and engageable by said last named pawl.

5. A lubricator for attachment to an oscillating member comprising a base, a weight slidable therein, a cylinder mounted on said base, a piston in said cylinder, a threaded rod attached to said piston, a ratchet adapted to propel said rod, a pair of driving pawls engaging said ratchet, means for actuating said pawls by movement of said weight in either direction, and means for disengaging one of said pawls from said ratchet.

6. A lubricator for attachment to an oscillating member comprising a base, a weight slidable therein, a cylinder mounted on said base, a piston in said cylinder, a threaded rod attached to said piston, a ratchet adapted to propel said rod, a pair of bell crank levers pivotally mounted in said base and connected to said weight, carriers loosely surrounding said rod, said levers having corresponding arms connected to said carriers, and pawls on said carriers and adapted to actuate said ratchet.

7. A lubricator for attachment to an oscillating member comprising a base, a weight slidable therein, a cylinder mounted on said base, a piston in said cylinder, a threaded rod attached to said piston, a ratchet adapted to propel said rod, a pair of bell crank levers pivotally mounted in said base and connected to said weight, carriers loosely surrounding said rod, said levers having corresponding arms connected to said carriers, and pawls on said carriers and adapted to actuate said ratchet, and means for disengaging one of said pawls from said ratchet.

8. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a bushing surrounding said rod and fixed in said cylinder, a ratchet on said bushing, a pair of pawl carriers adjacent said ratchet, pawls on said carriers and engaging said ratchet, connecting means between said carriers and weight for actuating said carriers by movement of said weight in either direction, a collar mounted eccentrically on said bushing, another carrier surrounding said collar and held against rotation, a ratchet carried by said nut, and a pawl on said last named carrier and engaging said last named ratchet.

9. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a bushing surrounding said rod and fixed in said cylinder, a ratchet on said bushing, a pair of pawl carriers adjacent said ratchet, pawls on said carriers and engaging said ratchet, connecting means between said carriers and weight for actuating said carriers by movement of said weight in either direction, a collar mounted eccentrically on said bushing, another carrier surrounding said collar and held against rotation, a ratchet carried by said nut, a pawl on said last named carrier and engaging said last named ratchet, and means for releasing one of said first named pawls from said first named ratchet.

10. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a bushing surrounding said rod and fixed in said cylinder, a ratchet on said bushing, a pawl carrier adjacent said ratchet, a pawl on said carrier and engaging said ratchet, a connection between said weight and carrier for operating said pawl, a collar mounted eccentrically on said bushing, a pawl carrier surrounding said collar and held against rotation, a pawl on said carrier, a ratchet carried by said nut and engageable by said last named pawl, a plunger adapted to release said last named pawl from said last named ratchet, and an operating member carried by the free end of said rod and adapted to engage said plunger.

11. A lubricator for attachment to an oscillating member comprising a base, a weight slidable therein, a cylinder mounted on said base, a piston in said cylinder, a threaded rod attached to said piston, means for holding said rod against rotation, a nut on said rod and held against sliding in said cylinder, a bushing surrounding said rod and fixed in said cylinder, a ratchet on said bushing, a pair of pawl carriers adjacent said ratchet, pawls on said carriers and engaging said ratchet, connecting means between said carriers and weight for actuating said carriers by movement of said weight in either direction, a collar mounted eccentrically on said bushing, another carrier surrounding said collar and held against rotation, a ratchet carried by said nut, a pawl on said last named carrier and engaging said last named ratchet, a plunger adapted to release said last named pawl from said last named ratchet, and an operating member carried by the free end of said rod and adapted to engage said plunger.

12. A lubricator for attachment to an oscillating member comprising a base, a weight slidable therein, a cylinder mounted on said base, a piston in said cylinder, a threaded rod attached to said piston, a ratchet adapted to propel said rod, a pair of bell crank levers pivotally mounted in said base and connected to said weight, carriers loosely surrounding said rod, said levers having corresponding arms connected to said carriers, pawls on said carriers and adapted to actuate said ratchet, and means supported by one of said carriers for disengaging the pawl of said carrier from said ratchet.

13. A lubricator for attachment to an oscillating member comprising a base, a weight slidable therein, a cylinder mounted on said base, a piston in said cylinder, a threaded rod attached to said piston, a ratchet adapted to propel said rod, a pair of bell crank levers pivotally mounted in said base and connected to said weight, carriers loosely surrounding said rod, said levers having corresponding arms connected to said carriers, pawls on said carriers and adapted to actuate said ratchet, and a cam member supported by one of said carriers for disengaging the pawl on said carrier from said ratchet.

In testimony whereof I affix my signature.

ARAH CLARE FOX.